US007559699B2

(12) United States Patent
Tamada (10) Patent No.: US 7,559,699 B2
(45) Date of Patent: Jul. 14, 2009

(54) OPTICAL COUPLING MODULE

(75) Inventor: Jun Tamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/984,535

(22) Filed: Nov. 19, 2007

(65) Prior Publication Data
US 2008/0145000 A1    Jun. 19, 2008

(30) Foreign Application Priority Data
Dec. 8, 2006  (JP) .............................. 2006-331488

(51) Int. Cl.
*G02B 6/38* (2006.01)
(52) U.S. Cl. .............................. 385/55; 385/58; 385/60
(58) Field of Classification Search ........................ None
See application file for complete search history.

(56) References Cited

U.S. PATENT DOCUMENTS

| | | | | |
|---|---|---|---|---|
| 2002/0131721 A1* | 9/2002 | Gaio et al. | ..................... | 385/60 |
| 2003/0059169 A1* | 3/2003 | Watanabe et al. | ............. | 385/60 |
| 2003/0059170 A1* | 3/2003 | Shouji et al. | ................... | 385/72 |
| 2003/0103731 A1* | 6/2003 | Gogte | .......................... | 385/70 |
| 2003/0231838 A1* | 12/2003 | Takeda et al. | .................. | 385/60 |
| 2005/0123240 A1* | 6/2005 | Seto et al. | ...................... | 385/35 |
| 2008/0008429 A1* | 1/2008 | Endou et al. | .................. | 385/93 |
| 2008/0013894 A1* | 1/2008 | Aoki et al. | ..................... | 385/88 |

OTHER PUBLICATIONS

Patent Abstracts of Japan, Publication No. 2005-156969, published Jun. 16, 2005 (1 page).
Patent Abstracts of Japan, Publication No. 2006-039274, published Feb. 9, 2006 (1 page).
Patent Abstracts of Japan, Publication No. 2006-091735, published Apr. 6, 2006 (1 page).

* cited by examiner

*Primary Examiner*—Sung H Pak
(74) *Attorney, Agent, or Firm*—Fujitsu Patent Center (57) ABSTRACT

An optical coupling module for suppressing optical loss by improving degradation of a wiggle characteristic exhibited upon application of an external force. A sleeve joins end faces of optical fibers. A sleeve casing covers the sleeve to protect the joined surfaces of the optical fibers. A splitting slit portion having a return structure is formed in a side of the sleeve. The sleeve casing comprises an inner sleeve casing for covering the sleeve, and an outer sleeve casing for covering the inner sleeve casing. The inner sleeve casing has a side formed with slits. The outer sleeve casing has an inner surface formed with guards for holding the sleeve. The outer sleeve casing is slidingly mounted by inserting the guards into the slits.

13 Claims, 14 Drawing Sheets

OPTICAL COUPLING MODULE

CROSS-REFERENCE TO RELATED APPLICATIONS

This application is based upon and claims the benefits of priority from the prior Japanese Patent Application No. 2006-331488, filed on Dec. 8, 2006, the entire contents of which are incorporated herein by reference.

BACKGROUND OF THE INVENTION

1. Field of the Invention

This invention relates to an optical coupling module, and more particularly to an optical coupling module for coupling optical fibers to each other.

2. Description of the Related Art

When optical fibers are coupled by an optical connector, if optical axes of the optical fibers are displaced from each other in the coupled portion, insertion loss is generated due to radiation of light. Therefore, to prevent the insertion loss from being caused by the displacement of the optical axes, conventionally, coupling of optical fibers has been performed using a split sleeve.

Figure 9:
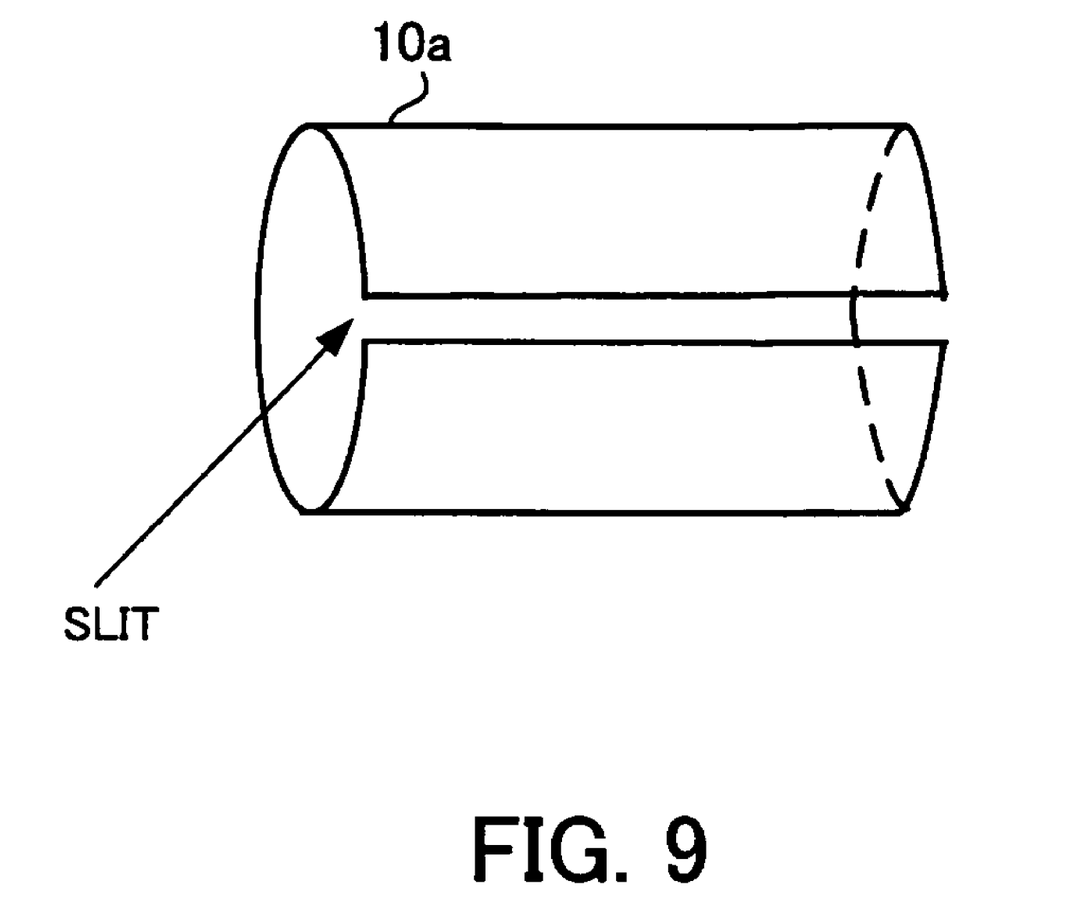
FIG. 9 is a view of a split sleeve.

FIG. 9 is a view of the split sleeve. The split sleeve 10a is provided with a slit. The sleeve is a hollow cylindrical part for positioning end faces of optical fibers, and in general, a hollow cylindrical sleeve having a slit formed in the direction of the length thereof is called a "split sleeve".

Figure 10:
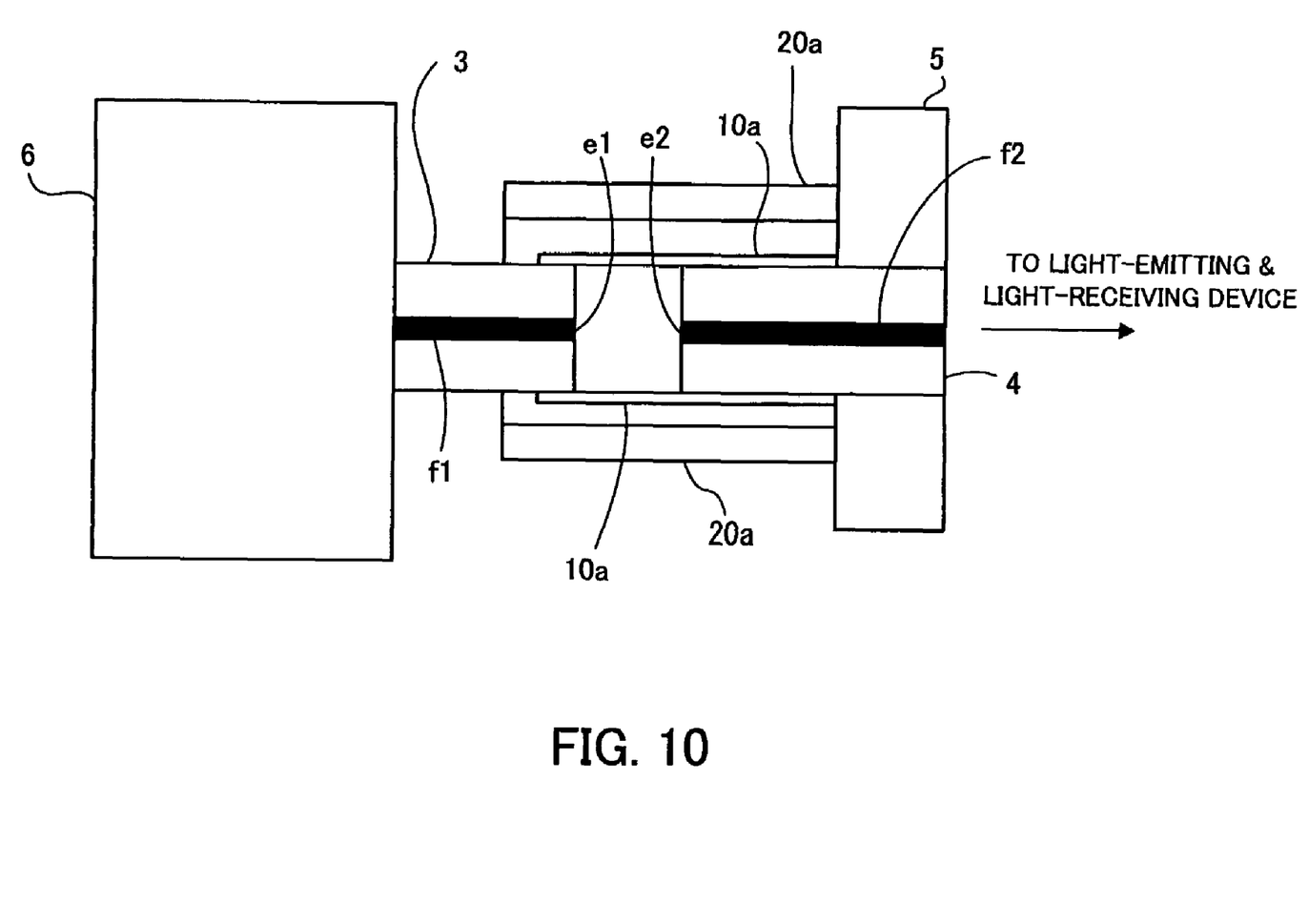
FIG. 10 is a view of the appearance of an optical coupling portion.

FIG. 10 is a view of the appearance of an optical coupler part. An optical connector 6 is formed with a ferrule 3 for holding an optical fiber f1, while an optical device housing 5 is formed with a fiber stub 4 (associated with a ferrule on a receiving side) for holding an optical fiber f2. A split sleeve 10a is housed in a sleeve casing 20a, and the fiber stub 4 is inserted into an inner hole on a right end side of the split sleeve 10a, as viewed in the figure.

In coupling (joining) the optical fiber f1 on the connector side to the optical fiber f2 on the housing side, the ferrule 3 on the connector side is inserted into an inner hole formed on a left end side of the split sleeve 10a, as viewed in the figure.

As the ferrule 3 is inserted, the split sleeve 10a is elastically deformed, causing an end face e1 of the optical fiber f1 to be joined to an end face e2 of the optical fiber f2, such that the optical axes of the optical fibers f1 and f2 are aligned by causing the outer shape of the ferrule 3 to match that of the fiber stub 4. By using the split sleeve 10a described above, it is possible to substantially align the optical axes of the optical fibers f1 and f2 with the alignment effect of the split sleeve 10a obtained even when the positions of the optical axes are different from each other in the order of 100 μm.

As a conventional optical coupling technique, there has been proposed a technique in which a slit fixing portion for fixing the splitting slit of the split sleeve is provided, whereby even when a load in a perpendicular direction acts on the split sleeve, the sleeve is prevented from being deformed by excessive opening of the slit (e.g. in Japanese Laid-Open Patent Publication (Kokai) No. 2005-156969 (Paragraph numbers [0022] to [0034], and FIG. 1).

Conventionally, in the optical connector, optical loss generated at coupled end faces of the optical fibers largely varies depending on an external force applied to the optical connector. To avoid this problem, during a work for installing a large-capacity trunk optical communication system, a curing treatment (protective treatment), a forming treatment in which an optical fiber cable is held in a bent state, or a like countermeasure is carried out so as to prevent an external force from being applied to the optical connector.

On the other hand, recently, communication systems, such as routers, have become more sophisticated and faster, and optical interfaces have come to be more often used in small-scale routers. In installing a small-scale router, a simple work for laying an optical fiber is often carried out.

In this case, the protective measure is not sufficient compared with the work for installing the large-capacity trunk optical communication system, so that there is a risk, for example, that excessive load is momentarily applied to an optical fiber, e.g. when a worker carelessly stumbles over the optical fiber. To stabilize the communication even in such a situation, it is required to improve a wiggle characteristic, which is an optical loss-changing characteristic exhibited when an external force is applied to an optical connector or an optical fiber.

Figure 11:
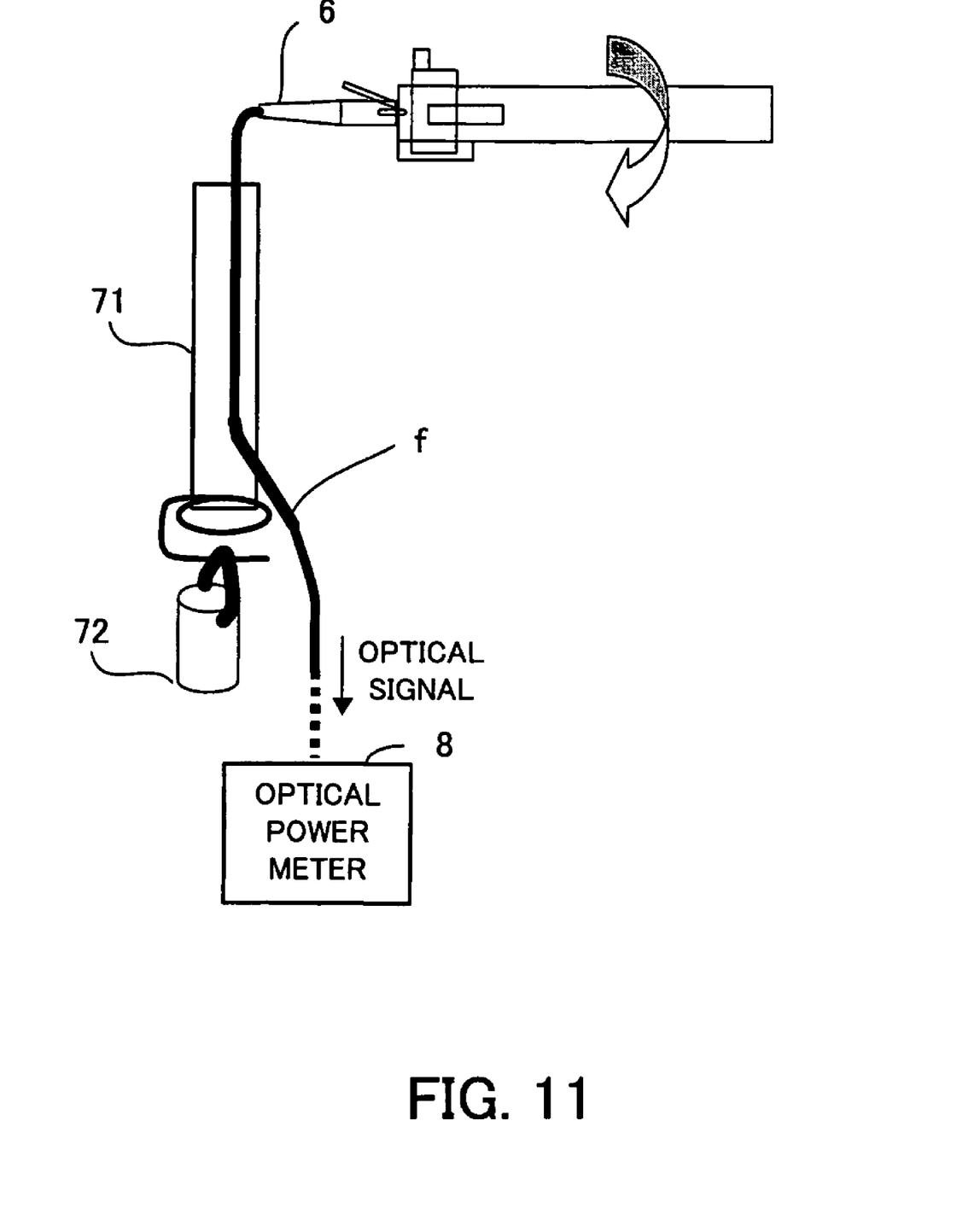
FIG. 11 is a view useful in explaining a wiggle characteristic.

FIG. 11 is a view useful in explaining the wiggle characteristic. As an environment for the measurement, the optical connector 6 is held parallel to the ground, and a load fixing portion 71 having a load 72 attached thereto is fitted on an optical fiber f stretched in a direction perpendicular to the ground. Further, an optical power meter 8 is connected to a leading end of the optical fiber f.

In this state, an optical signal is delivered toward the optical power meter 8 through the optical fiber f, and the relationship between the rotational angle of the optical connector 6 and a change in loss of the optical signal is measured while the optical connector 6 is rotated leftward and rightward each through 360°. The result of this measurement provides a value of the wiggle characteristic. It should be noted that as the load 72, there are employed a load of 0.5 pounds for an LC connector, and a load of 1.5 pounds for an SC connector.

Now, the influence of an external force depends on the structure of the optical connector 6. The shape of the structure of the fitting portion of the connector 6 does not have rotational symmetry with respect to the optical axis, and hence yield strength of the optical connector 6a against the external force has a rotational angle characteristic. Further, when the sleeve undergoes elastic deformation caused by the external force, in general, different characteristics are exhibited depending on the direction of rotation of the optical connector 6. Therefore, when the wiggle characteristic is discussed, it is necessary to consider both the angle characteristic of the rightward rotation and that of the leftward rotation. When the wiggle characteristic is degraded at a specific angle, the insertion loss is largely changed when a certain external force is applied in a direction corresponding to the specific angle, which lowers a reception level at a remote station, which can be a cause of communication errors.

Figure 12:
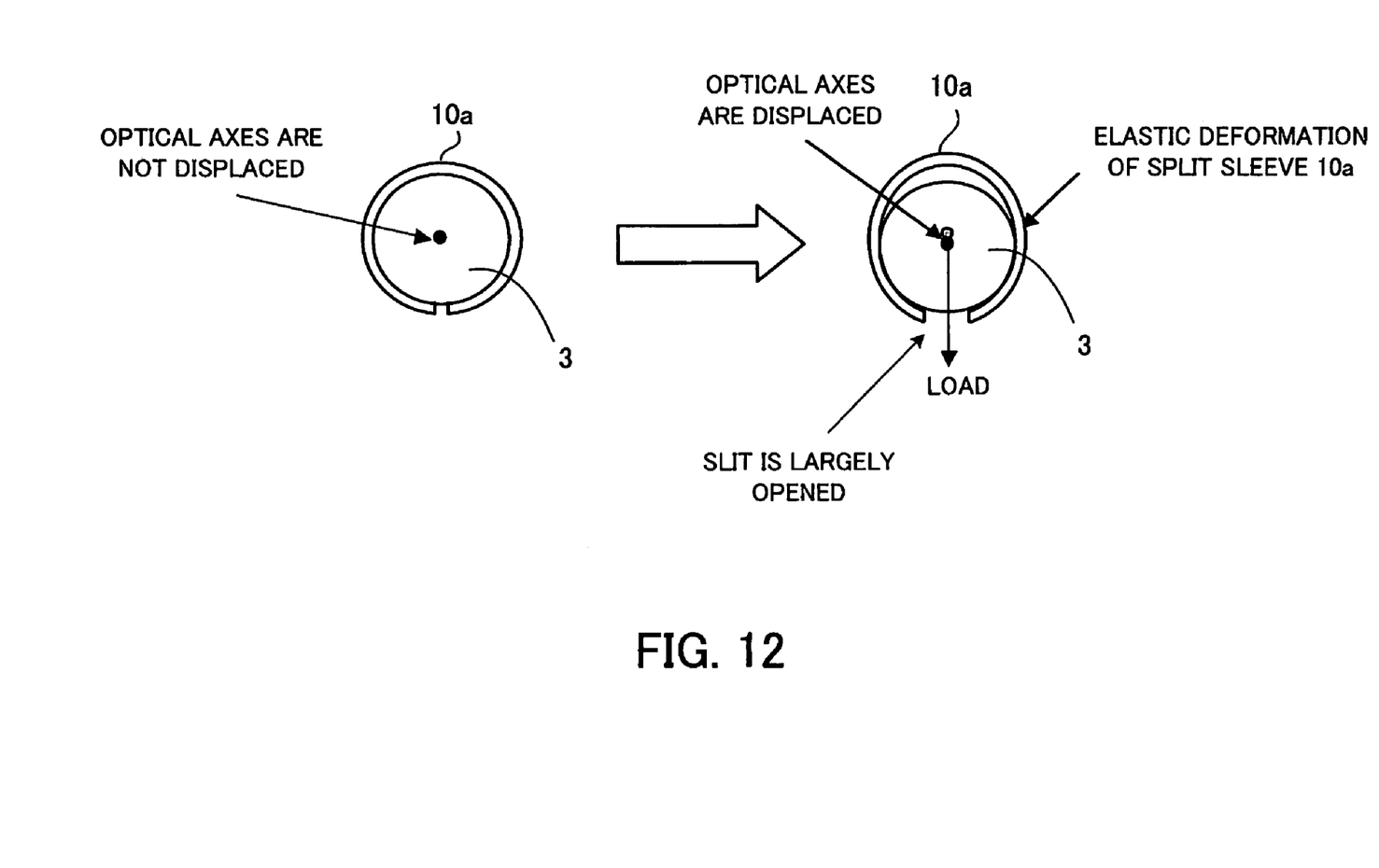
FIG. 12 is a view of a shape of the split sleeve formed when an external force is applied to the split sleeve.

FIG. 12 is a view of a shape of the split sleeve 10a formed when an external force is applied to the split sleeve 10a. The conventional split sleeve 10a holds the ferrule 3 with a stress obtained by the elastic deformation of the sleeve, to thereby align an optical axis on the receiving side and an optical axis inside the ferrule 3. At this time, the holding force of the split sleeve 10a per se is weak, and is insufficient to withstand the load 72 (the LC connector: 0.5 pounds, the connector: 1.5 pounds) used for evaluation of the wiggle characteristic.

As a result, when the load 72 described above is applied to the optical connector 6 or the optical fiber f, the conventional split sleeve 10a cannot withstand the external force, so that the slit of the split sleeve 10a is largely opened and the ferrule 3 is displaced in the direction of application of the external force, resulting in displaced optical axes.

Figure 13:
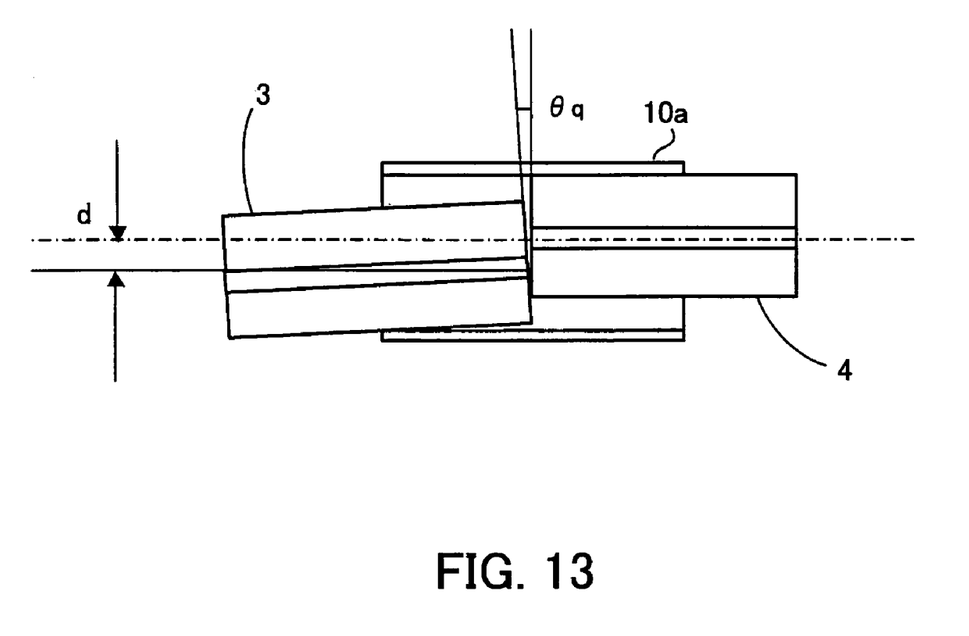
FIG. 13 is a view of a state in which the ferrule is displaced.

FIG. 13 is a view of a state in which the ferrule 3 is displaced. When an external force is applied perpendicularly downward to displace the ferrule 3, an angle θq between an end face of the ferrule 3 and an end face of the fiber stub 4 is increased (θq represents an angle created due to the difference (play) between the inner diameter of the split sleeve 10a and the outer diameter of the ferrule 3). At this time, the split sleeve 10a itself has undergone elastic deformation in the opening direction of the slit.

Now, when the target value of the wiggle characteristic is set to 1.5 dB, it is necessary to hold the width d of displacement of the optical axes not larger than 2 μm (when θq=0 holds), or hold the angle θq not larger than 0.36 degrees (when d=0 holds), according to the results of analysis of a model formed by Gaussian approximation of a propagation mode of the optical fiber.

In the conventional split sleeve 10a, however, changes in d and θq are large, so that generally, the value of the wiggle characteristic exceeds 10 db. Therefore, to prevent the elastic deformation in which the slit is opened, conventionally, a precision sleeve is sometimes employed which has an inner diameter machined more precisely than the inner diameter of the normal split sleeve 10a.

The precision sleeve has the inner diameter thereof precisely machined such that a gap between an inner surface of the sleeve and an outer surface of the ferrule 3 is as small as approximately several μm. In the LC connector, for example, with respect to the outer diameter φ of the ferrule in a range between 1.2485 mm and 1.2495 mm, the inner diameter φ of the precision sleeve is in a range between 1.251 mm and 1.252 mm.

The changes in d and θq of the precision sleeve are smaller than the changes in d and θq of the split sleeve 10a, so that the wiggle characteristic is improved to a certain degree compared with the split sleeve 10a. However, although the precision sleeve is precisely machined with respect to the inner diameter of the ferrule 3, it cannot be said that the precision sleeve is precisely machined with respect to the outer diameter of the fiber stub 4. Further, the precision sleeve suffers from the problem that "the tilt (inclination) of the sleeve" is caused by the difference between machining accuracies of individual fiber stubs.

Figure 14:
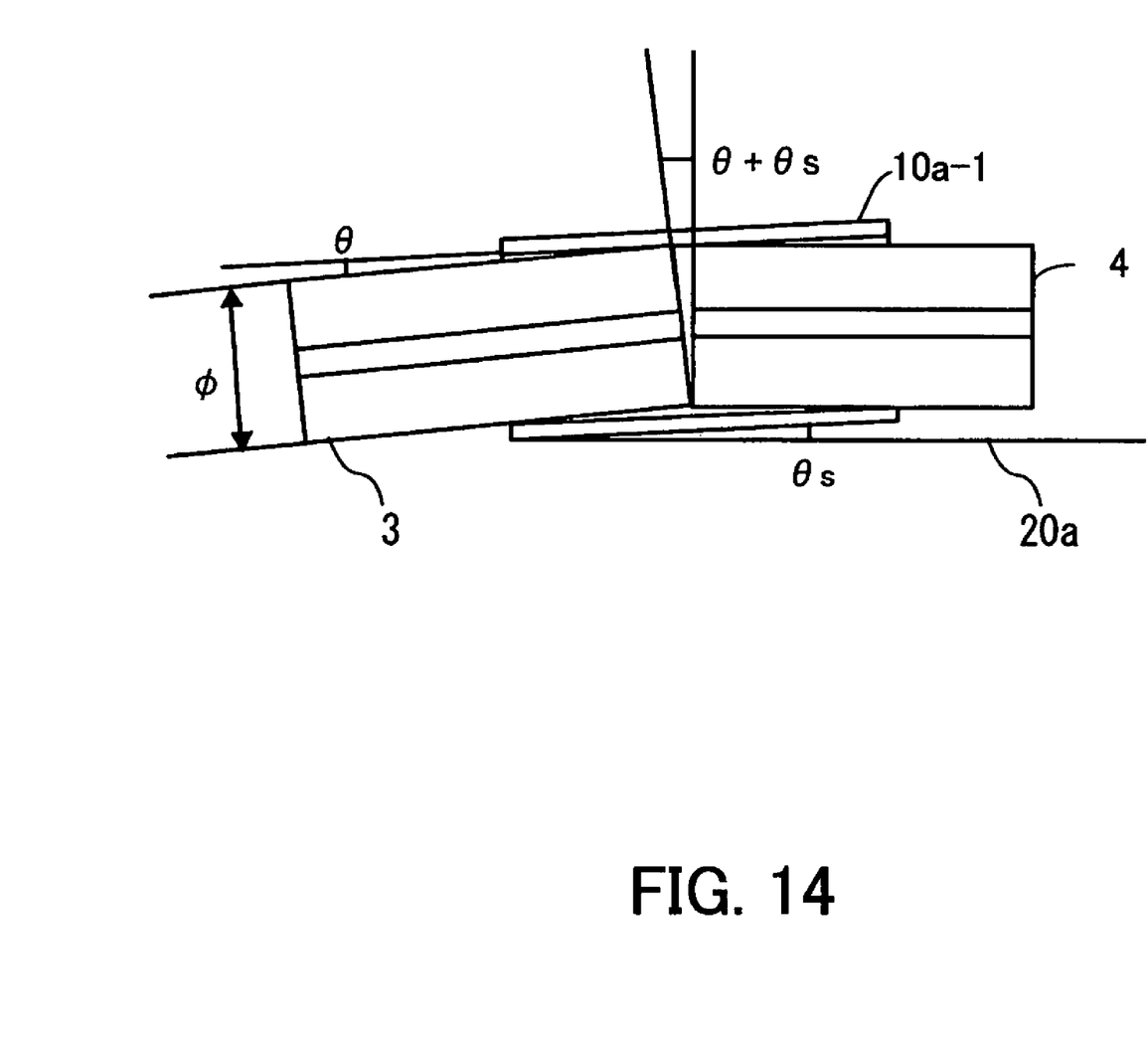
FIG. 14 is a view useful in explaining the tilt of a sleeve.

FIG. 14 is a view of the tilt of a sleeve. When an external force is applied to a precision sleeve 10a-1, the precision sleeve 10a-1 is tilted through an angle of θs at the maximum due to a gap between the inner surface of the precision sleeve 10a-1 and the outer surface of the fiber stub 4 (an inclination angle θs is formed between the precision sleeve 10a-1 and the sleeve casing 20a).

Further, the tilt of the precision sleeve 10a-1 sometimes causes the inclination or deformation of the fiber stub 4. Such a state causes degradation of the wiggle characteristic, and hence it is difficult to improve the wiggle characteristic simply by employing the precision sleeve 10a-1 (it is difficult to achieve the target value 1.5 dB of the wiggle characteristic). Furthermore, even if the precision sleeve 10a-1 is employed, the play of the ferrule 3, defined by the angular difference between the optical axes, cannot be sufficiently suppressed.

As described above, the conventional split sleeve 10a and the precision sleeve 10a-1 are required to have a structure capable of preventing excessive elastic deformation or a structure capable of preventing the tilt of the sleeve. To improve communication quality, further improvement measures are strongly demanded.

SUMMARY OF THE INVENTION

The present invention has been made in view of these points, and an object thereof is to provide an optical coupling module which improves degradation of a wiggle characteristic exhibited upon application of en external force to an optical fiber to thereby suppress optical loss.

To attain the above object, there is provided an optical coupling module for coupling optical fibers. This optical coupling module is characterized by comprising a sleeve that joins end faces of the optical fibers, and a sleeve casing that covers the sleeve to thereby protect the joined end faces of the optical fibers, wherein the sleeve has a side formed with a splitting slit portion having a return structure, and wherein the sleeve casing comprises an inner sleeve casing that covers the sleeve, and an outer sleeve casing that covers the inner sleeve casing, the inner sleeve casing having a side formed with a slit, the outer sleeve casing having an inner surface formed with a guard for holding the sleeve, the outer sleeve casing is slidingly mounted by inserting the guard into the slit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
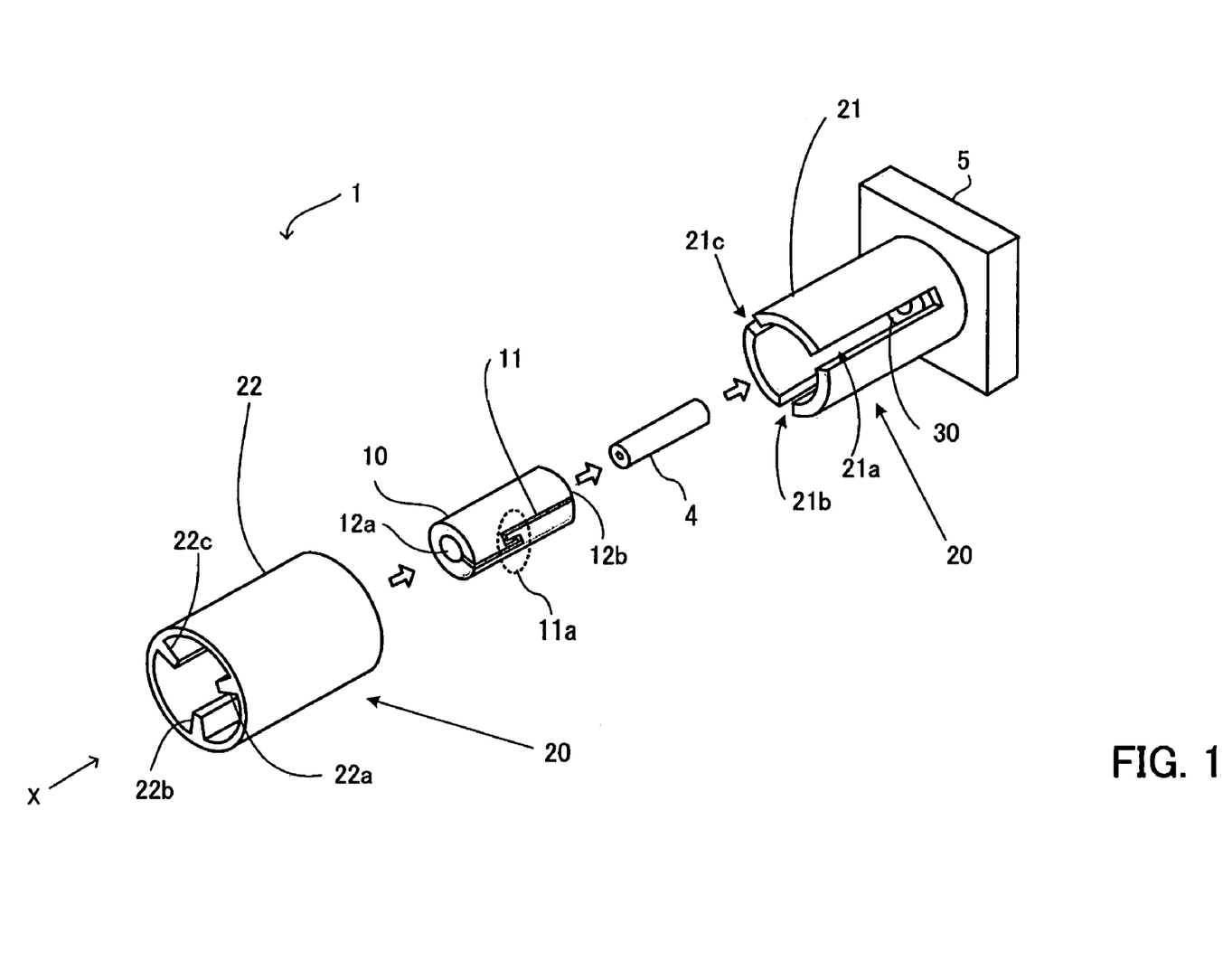
FIG. 1 is a development view of component parts of an optical coupling module.
Figure 2:
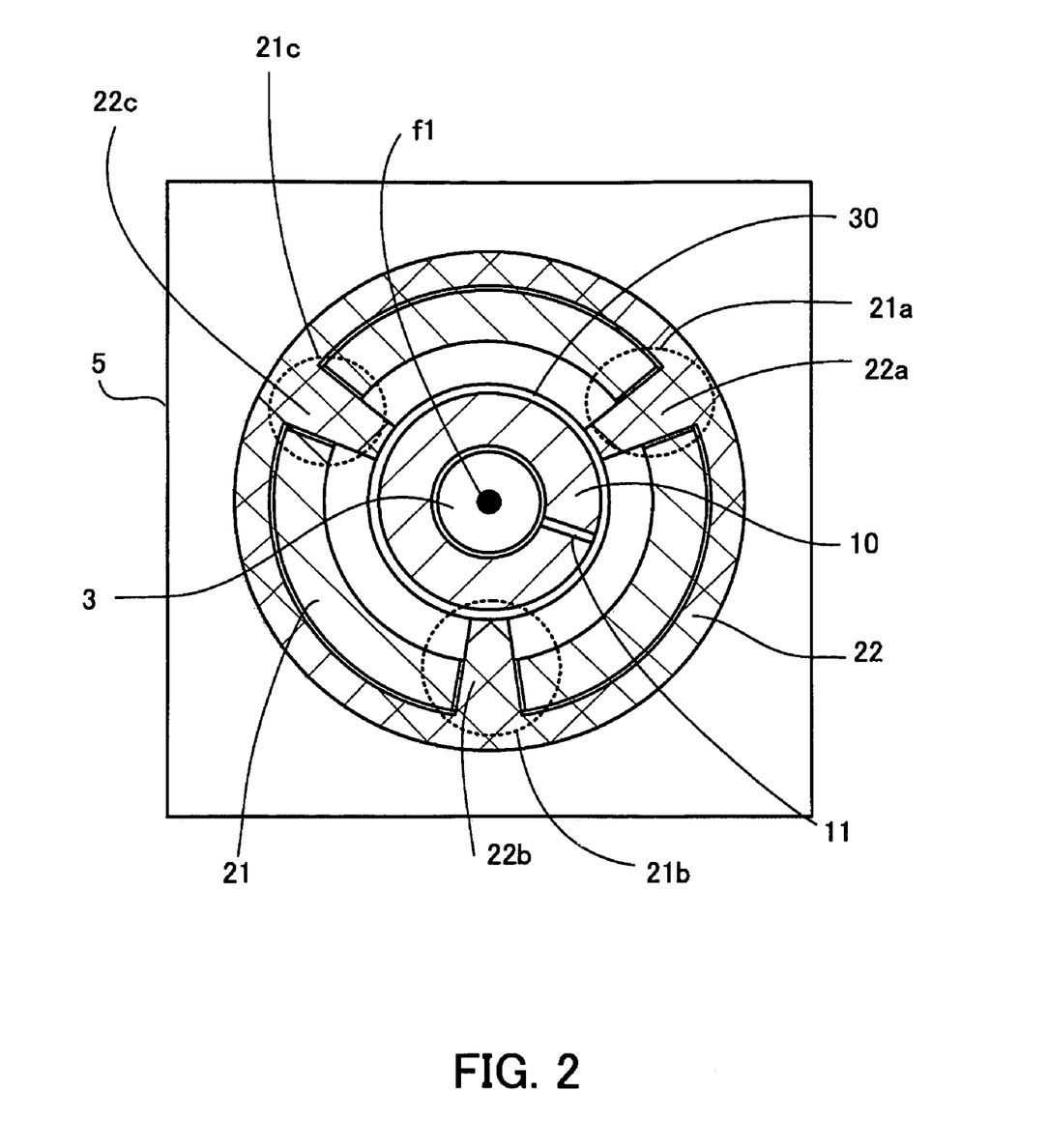
FIG. 2 is a front view of the optical coupling module, as viewed from the X direction.
Figure 3:
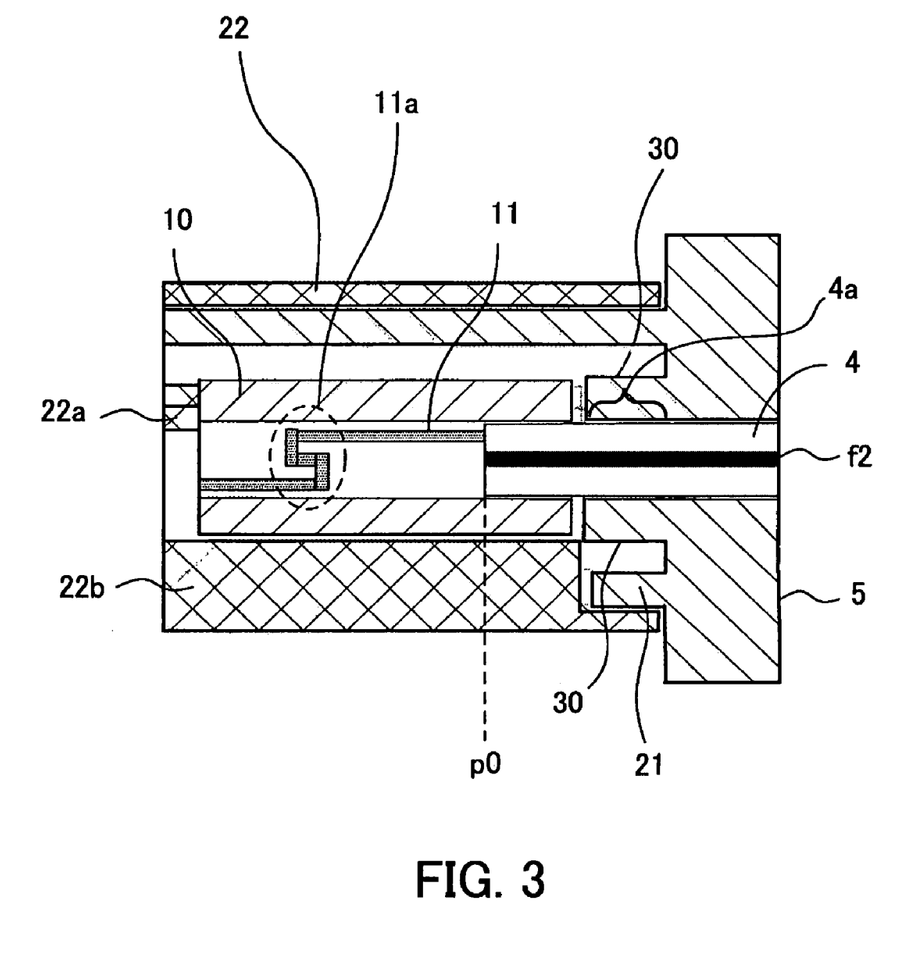
FIG. 3 is a cross-sectional view of the optical coupling module, as viewed from a side thereof.

The invention will now be described in detail with reference to drawings showing a preferred embodiment thereof. FIG. 1 is a development view of component parts of an optical coupling module. FIG. 2 is a front view of the optical coupling module, as viewed from the X direction. FIG. 3 is a cross-sectional view of the optical coupling module, as viewed from a side thereof.

The optical coupling module 1 comprises a split sleeve 10 provided with a return structure (hereinafter simply referred to as "the sleeve 10"), a sleeve casing 20, and an inner stub 30, and is used for coupling optical fibers to each other.

Inserted into one inner hole 12a and the other inner hole 12b of the sleeve 10 are a ferrule 3 for holding an optical fiber f1 and a fiber stub 4 for holding an optical fiber f2, respectively, whereby an end face of the optical fiber f1 and an end face of the optical fiber f2 are joined to each other.

The sleeve 10 is made of a hardly deformed material, such as zirconium oxide, and the side of a hollow cylindrical shape thereof is formed with a splitting slit portion 11 which has a return structure 11a for limiting elastic deformation by application of an external force in a perpendicular direction. Although in FIG. 3 et. seq., the return structure 11a is S-shaped, by way of example, it may have any other shape insofar as it can limit elastic deformation by the shape (the action of the return structure 11a will be described hereinafter with reference to FIGS. 6 and 7). It should be noted that the sleeve 10 is a precision sleeve having an inner diameter precisely machined such that the distance of a gap between the inner surface of the sleeve 10 and the outer surface of the ferrule 3 is as small as approximately several μm.

The sleeve casing 20 is provided for covering the sleeve 10 to protect respective joining surfaces of the optical fibers f1 and f2, and comprises an inner sleeve casing 21, and an outer sleeve casing 22.

The inner sleeve casing 21 has a side formed with slits 21a to 21c, and the outer sleeve casing 22 has an inner surface formed with guards 22a to 22c for holding the sleeve 10.

The ferrule 3 for holding the optical fiber f1 is inserted into the sleeve 10 from the one inner hole 12a. Further, the fiber stub 4 for holding the optical fiber f2 is inserted into the sleeve 10 from the other inner hole 12b. This joins the end face of the optical fiber f1 and the end face of the optical fiber f2 to each other within the sleeve 10.

The housing 5 of the optical device has an inner stub 30 mounted therein. A rear end 4a of the fiber stub 4, not covered with the sleeve 10 (FIG. 3) is inserted into the inner stub 30, whereby the inner stub 30 fixedly holds the fiber stub 4.

The inner sleeve casing 21 is mounted in a manner covering the inner stub 30 and the sleeve 10. The outer sleeve casing 22 is slidingly mounted on the inner sleeve casing 21 by inserting the guards 22a to 22c into the slits 21a to 21c.

Figure 4:
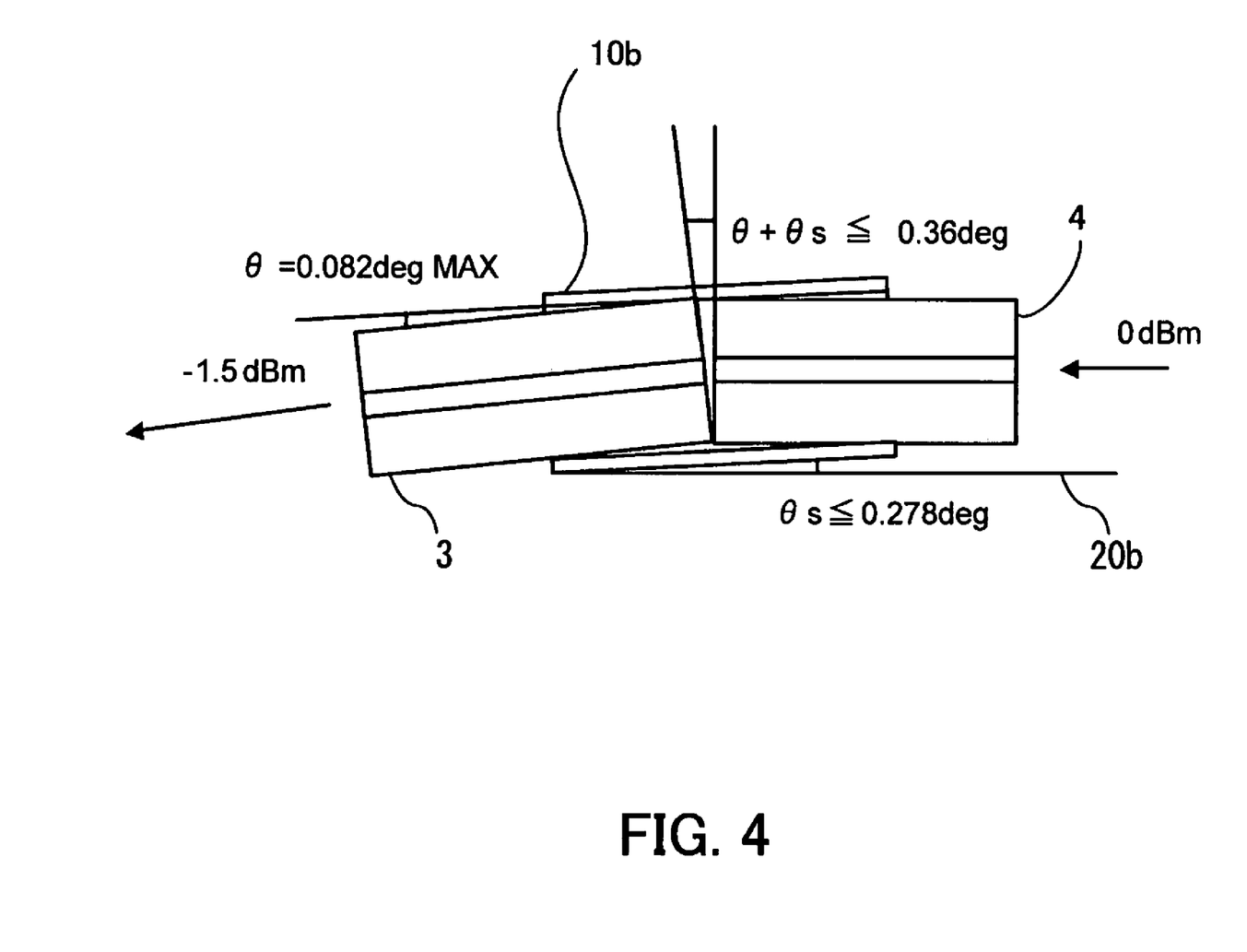
FIG. 4 is a model view useful in explaining the tilt of a sleeve and the play of a ferrule.

Next, a description will be given of the construction of the optical coupling module 1 that solves the conventional problems. FIG. 4 is a model view useful in explaining the tilt of the sleeve and the play of the ferrule, and shows the positional relationship between the ferrule 3, the sleeve 10b, and the fiber stub 4, exhibited when the external force acts perpendicularly downward. It should be noted that in FIG. 4, θ represents an inclination angle (ferrule angle) generated due to the difference between the inner diameter of the sleeve 10b and the outer diameter of the ferrule 3, and θs represents an inclination angle (sleeve angle) generated due to the difference between the outer diameter of the sleeve 10b and the inner diameter of a sleeve casing 20b.

Now, let us consider a case in which when the perpendicular external force is applied to the sleeve 10b, the ferrule angle θ assumed when d=0 holds becomes maximum, wherein d represents the width of the displacement of optical axes as shown in FIG. 13.

First, when there is no tilt of the sleeve (θs=0 degrees), the maximum value of θ becomes equal to 0.082 degrees.

If the target value of the wiggle characteristic is set to 1.5 dB, the limit value of θq=θ+θs is equal to 0.36 degrees, as described above, and therefore it is necessary to set the sleeve angle θs to a value not larger than 0.278 degrees (=0.36 degrees−0.082 degrees).

As shown in FIGS. 1 to 3, the optical coupling module 1 includes the three component parts, such as the inner stub 30, the sleeve casing 20, and the sleeve 10, and with this construction, it is possible to improve the wiggle characteristic such that the above requirement of θs is satisfied.

First, the inner stub 30 is mounted in the housing 5, and the fiber stub 4 is fixed to the inner stub 30 by press-fitting. When the external force is applied, if the fiber stub 4 is inclined (moved due to the presence of play), the inclination of the fiber stub 4 leads to the tilt of the sleeve and the play of the ferrule, so that the fiber stub 4 is fixed to the inner stub 30 to thereby limit the inclination and the deformation of the fiber stub 4.

Further, the sleeve casing 20 composed of the inner sleeve casing 21 and the outer sleeve casing 22 is provided so as to limit the inclination of the sleeve 10 by the guards 22a to 22c of the outer sleeve casing 22.

It should be noted that the guards 22a to 22c formed on the outer sleeve casing 22 are radially arranged with respect to the side of the sleeve 10 in association with the respective positions of the slits 21a to 21c. Although the length of the guards 22a to 22c has no direct influence on θs, the structure of the optical coupling module is such that the inner stub 30 is covered with the inner surface of the inner sleeve casing 21, and hence it is considered that when the outer sleeve casing 22 is slidingly mounted on the inner sleeve casing 21, the guards 22a to 22c interfere (collide) with the inner stub 30.

To prevent the guards 22a to 22c from interfering with the inner stub 30, the guards 22a to 22c are formed at respective locations outward of the inner stub 30, i.e. to have such a length as will prevent them from reaching an end face of the inner stub 30 on an opening side.

Further, although the guards 22a to 22c are formed at three respective locations, by way of example, by increasing the number of the guards and reducing the interval between respective dispositions of the same, it is possible to make the sleeve 10 more stable against the applied external force. Generally, the sleeve 10 can be at least fixed by a minimum number of three support points. However, it is desirable to provide as many support points as possible to the limit of the machining technique, since it is considered that a force for holding the sleeve is reduced in some degree when a load acts in a direction between the guards.

On the other hand, the sleeve 10 is formed with the splitting slit portion 11 having the return structure 11a. This structure is capable of limiting elastic deformation compared with the conventional split sleeve when an external force is applied in the perpendicular direction, and hence it is possible to limit the inclination of the ferrule 3 within the sleeve 10.

Further, the return structure 11a is formed on a side where the external force is applied. If the external force is applied toward the optical fiber f1 (toward the ferrule 3), as shown in FIG. 3, the return structure 11a is formed at a location outward of a position p0 of the joining surfaces of the optical fibers f1 and f2 (location closer to the ferrule). This makes it easier to limit elastic deformation against the external force, which makes it easier to obtain the stability of the joining surfaces of the optical fibers f1 and f2.

As described above, thanks to the interactions between the respective features of the three component parts, i.e. the inner stub 30, the sleeve casing 20, and the sleeve 10, it is possible to prevent the sleeve from tilting and the ferrule from moving due to the presence of play, against the external force applied in the direction perpendicular to the optical axis, and therefore, it is possible to achieve a target value of the wiggle characteristic (i.e. to make the sleeve angle θs not larger than 0.278 degrees, to thereby ensure 1.5 dB which is the target value of the wiggle characteristic), thereby making it possible to enhance communication quality.

It should be noted that the provision of the splitting slit portion 11 having the return structure 11a enables the sleeve 10 itself to limit elastic deformation caused by application of the external force. This enables the sleeve 10 to suppress the tilt thereof by itself, whereby the inner diameters of the guards 22a to 22c are not necessarily required to be machined precisely, thereby making it possible to alleviate the requirement of machining accuracy. As described above, the use the optical coupling module 1 makes it possible not only to improve the wiggle characteristic but also to enhance the efficiency of machining operations of the respective component parts.

Figure 5:
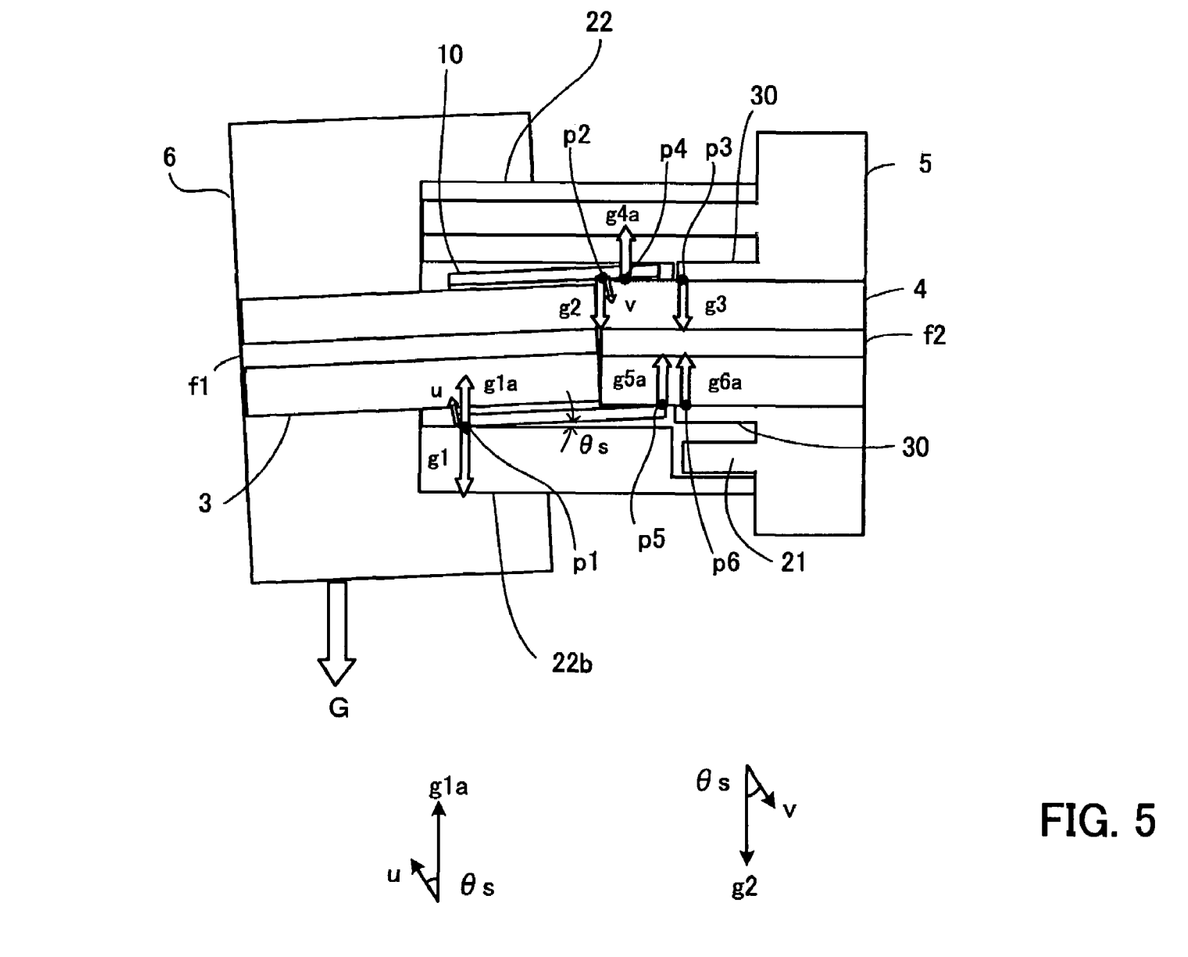
FIG. 5 is a view useful in explaining actions of all the component parts of the optical coupling module.

Next, the action of the optical coupling module 1 will be described with reference to FIGS. 5 to 7. FIG. 5 is a view useful in explaining the actions of all the component parts of the optical coupling module 1. Now, let it be assumed that in FIG. 5, a load G is applied perpendicularly downward to the optical connector 6, and the sleeve 10 is inclined at the angle θs with respect to the inner sleeve casing 21.

In this case, a dispersed load g1 is applied perpendicularly downward to a contact point p1 between the sleeve 10 and the guard 22b; a dispersed load g2 is applied perpendicularly downward to a contact point p2 between the ferrule 3 and the sleeve 10; and a dispersed load g3 is applied perpendicularly downward to a contact point p3 between the fiber stub 4 and the inner stub 30.

Further, a repulsive force g1a is applied perpendicularly upward to the contact point p1, a repulsive force g4a is applied perpendicularly upward to a contact point p4 between the sleeve 10 and the fiber stub 4; a repulsive force g5a is applied perpendicularly upward to a contact point p5 between the sleeve 10 and the fiber stub 4; and a repulsive force g6a is applied perpendicularly upward to a contact point p6 between the fiber stub 4 and the inner stub 30.

Now, with the arrangement of the guard 22b and the return structure 11a, not shown in FIG. 5, of the sleeve 10, an upward stress u at the angle θs is applied to the contact point p1 in response to the perpendicularly upward repulsive force g1a, and a downward stress v at the angle θs is applied to the contact point p2 in response to the perpendicularly downward dispersed load g2. As a result, a restoring stress acts against the load G applied to the ferrule 3 in a direction opposite to the direction of the load G, and hence it is possible to limit the tilt and the elastic deformation of the sleeve 10, to thereby hold the position of the optical axis with respect to the joining surfaces of the ferrule 3 and the fiber stub 4.

On the other hand, as for the fiber stub 4, the repulsive forces g5a and g6a for moving the sleeve upward are applied to the optical axis of the fiber stub 4, but the fiber stub 4 is fixed by the inner stub 30, whereby the movement due to the play of the fiber stub 4 can be sufficiently suppressed. Further, since the dimensional difference between the inner diameter of the guard 22b of the outer sleeve casing 22 and the outer diameter of the sleeve 10 is small, it is possible to limit the inclination of the sleeve 10 within the inner sleeve casing 21, whereby the position of the optical axis in the joining surfaces of the ferrule 3 and the fiber stub 4 can be positively held.

Figure 6:
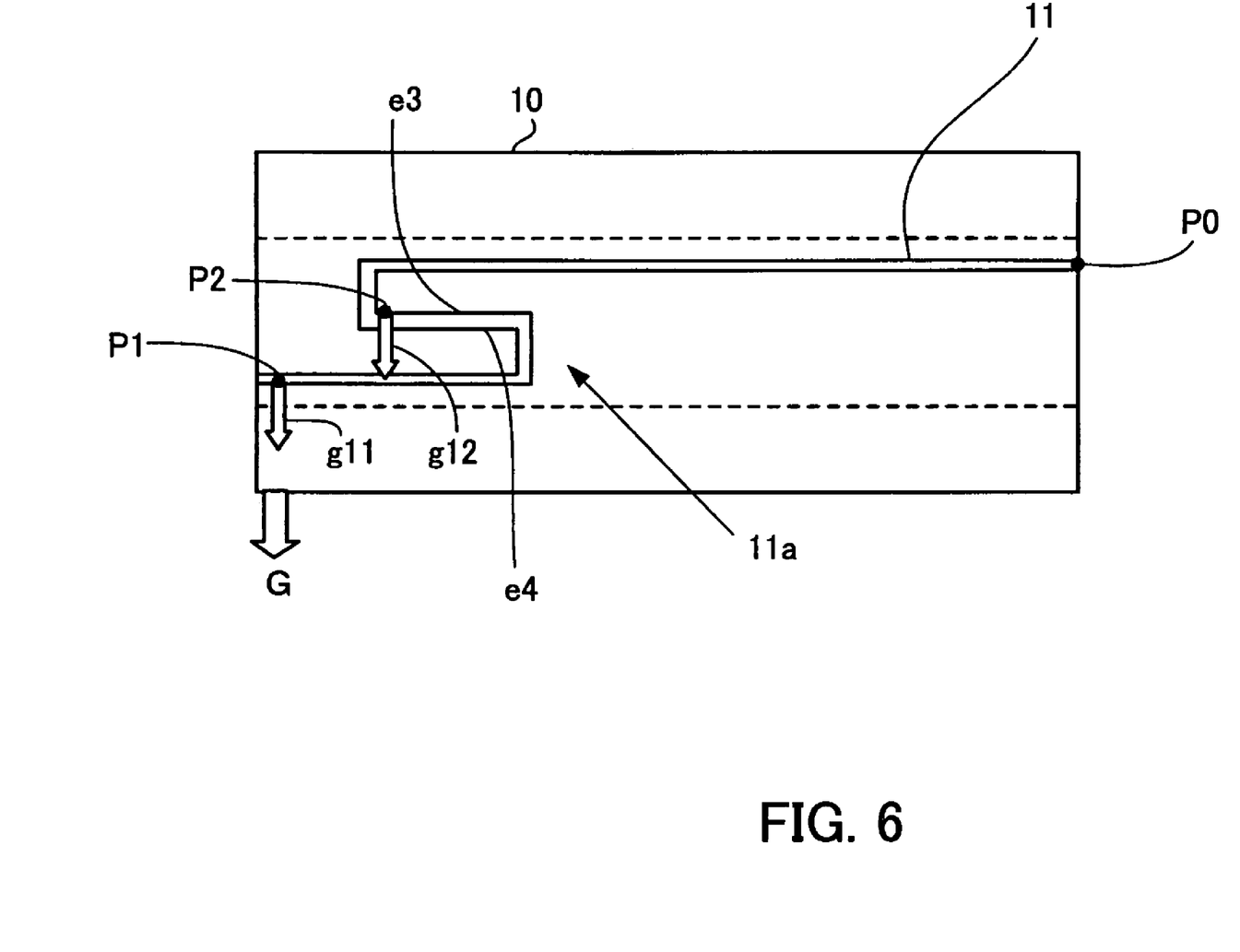
FIG. 6 is a view useful in explaining an action of a return structure of the sleeve.
Figure 7:
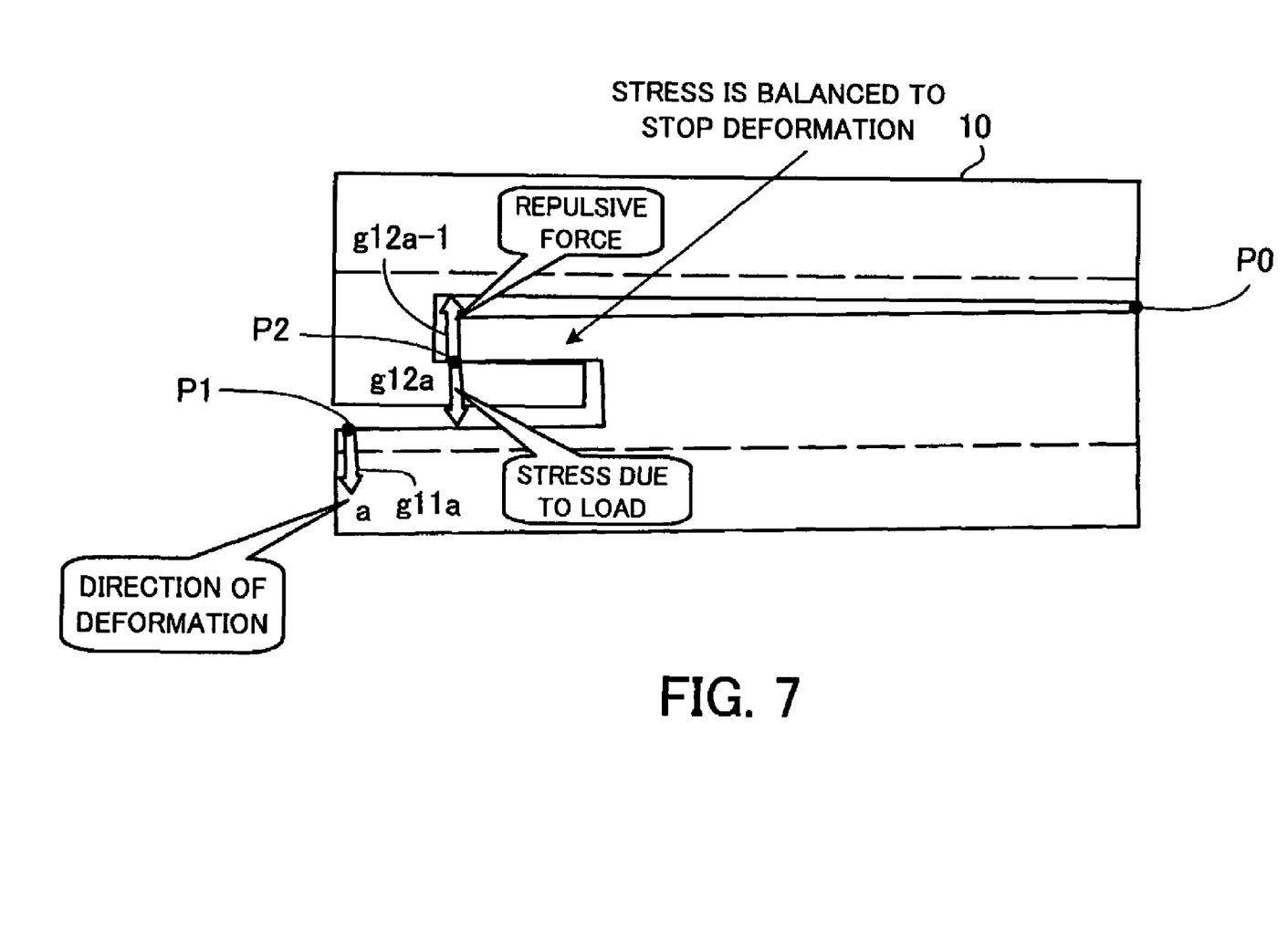
FIG. 7 is a view useful in explaining the action of the return structure of the sleeve.

FIGS. 6 and 7 are views showing the action of the return structure 11a of the sleeve 10. FIG. 6 shows a state of the sleeve 10 before being deformed when an external force is applied perpendicularly downward to the sleeve 10, and FIG. 7 shows a state of stress of the return structure 11a balanced when the external force is applied perpendicularly downward.

Referring to FIG. 6, when the load G is applied perpendicularly downward, dispersed loads g11 and g12 are applied to a position P1 of the splitting slit portion 11 and a position P2 within the return structure 11a of the splitting slit portion 11, respectively, with a portion functioning as a support at a position P0 when the splitting slit portion is opened, whereby the sleeve 10 is deformed downward.

Referring to FIG. 7, when the dispersed load g11 is applied to the position P1, a dispersed load g11a acts in a direction of "a" due to the presence of the splitting slit portion, whereby the splitting slit portion is opened in the direction of "a".

On the other hand, when the dispersed load g12 is applied to the position P2, a dispersed load g12a acts in the direction of "a" due to the presence of the splitting slit portion. However, surfaces e3 and e4, shown in FIG. 6, are brought into contact with each other at this time, so that a stress g12a-1, which is a repulsive force acting in a direction opposite to the direction of "a" against the dispersed load g12a, is generated at the position P2. This makes the dispersed load g12a and the stress g12a-1 balanced at the position P2 of the return structure 11a, whereby the elastic deformation of the sleeve 10 is limited.

Figure 8:
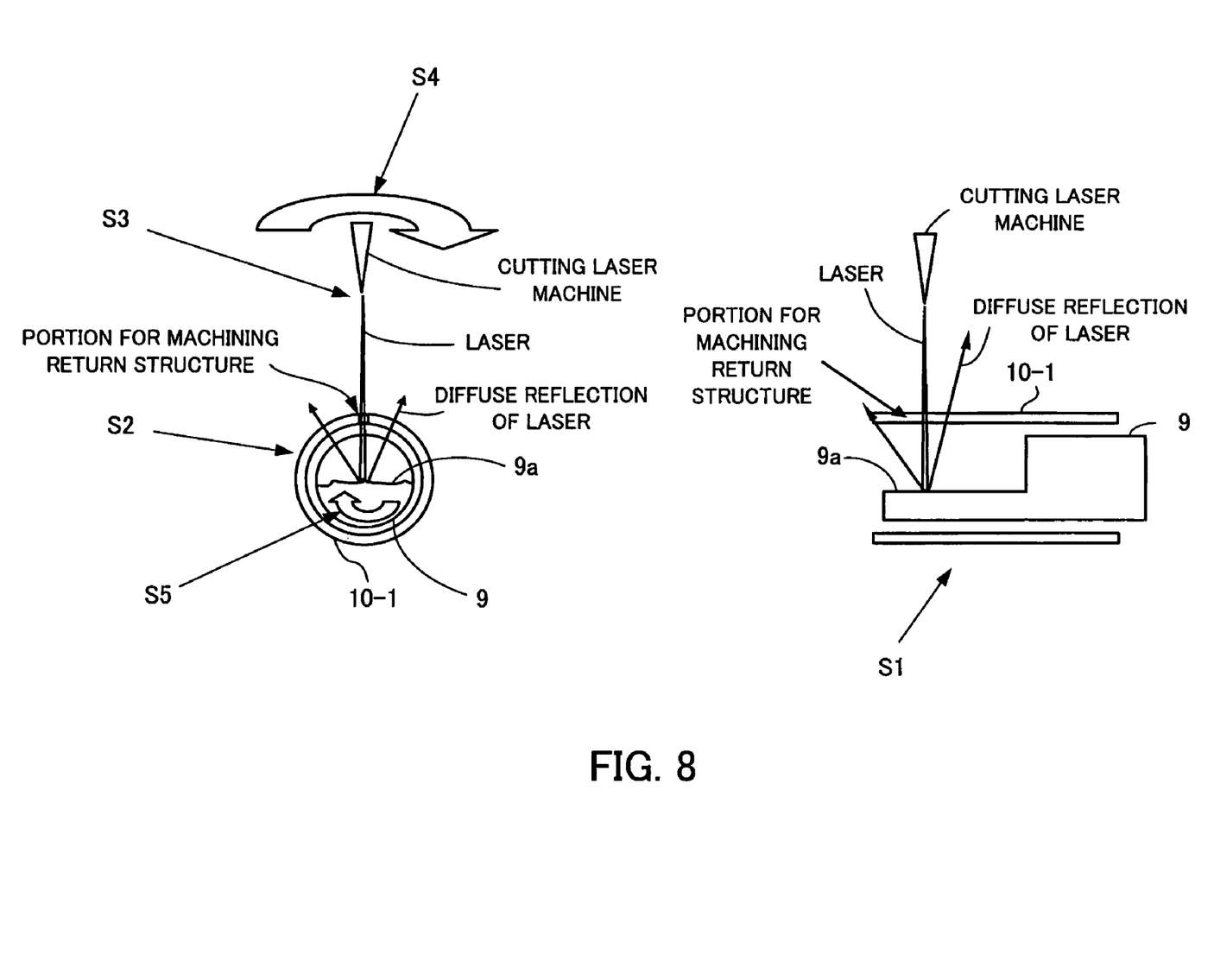
FIG. 8 is a view useful in explaining a method of manufacturing the sleeve.

Next, a description will be given of a method of forming the return structure 11a of the splitting slit portion 11 in a precision sleeve to thereby manufacture the sleeve 10. FIG. 8 is a view useful in explaining the method of manufacturing the sleeve 10.

[S1] A semi-cylindrical metal rod 9 having a surface 9a at an end portion thereof for diffusely reflecting a laser beam is inserted into the inside of a die-cut precision sleeve 10-1.

[S2] The precision sleeve 10-1 is fixed such that it is prevented from following up the motion of the metal rod 9 inserted therein.

[S3] A cutting laser machine radiates a focused laser beam toward the surface 9a at the end portion of the metal rod 9 from outside the precision sleeve 10-1.

[S4] The cutting laser machine radiates the laser beam while being moved in accordance with the shape of the return structure 11a.

[S5] The metal rod 9 is operated in a manner interlocked with the motion of the cutting laser machine such that the laser beam hits the surface 9a at the end portion. Further, after forming the shape of the return structure 11a, burrs formed on the inner diameter side of the sleeve are removed by polishing. The above-described method makes it possible to form the return structure 11a having a desired shape in a side of the precision sleeve 10-1 to form the sleeve 10.

As described heretofore, according to the present invention, the degree of stability of the sleeve 10 against an external force is by far higher than that of the conventional split sleeve and that of the precision sleeve, which makes it possible to markedly improve the wiggle characteristic. This makes it possible to maintain a stable signal level to prevent generation of communication errors at an remote station, even when an external force is applied to the optical connector or the optical fiber.

The optical coupling module according to the present invention is configured to include a sleeve that is formed with a splitting slit portion having a return structure, an inner sleeve casing that has slits formed in a side thereof and covers the sleeve, and an outer sleeve casing that has an inner surface formed with guards for holding the sleeve, and is slidingly mounted by inserting the guards into the slits. With this configuration, it is possible to improve degradation of the wiggle characteristic exhibited upon application of an external force, to thereby suppress optical loss, and hence it is possible to improve communication quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A sleeve apparatus, comprising:
   a sleeve body configured to hold and join two optical fibers therein;
   a slit extending from an end of the sleeve apparatus to another end of the sleeve apparatus; and,
   a return structure formed in the slit at a portion at which the slit reverses its direction of extension.

2. An optical coupling module comprising:
   a sleeve having a sleeve body configured to include optical fibers connected therein, and a slit extending from an end of the sleeve to another end of the sleeve; and
   a sleeve casing that holds the sleeve; wherein,
   the slit portion has a return structure at a portion at which the slit reverses its direction of extension, and
   the sleeve casing comprises an inner sleeve casing that covers said sleeve, and an outer sleeve casing that covers said inner sleeve casing, said inner sleeve casing having a side formed with a slit, said outer sleeve casing having an inner surface formed with a guard for holding said sleeve, said outer sleeve casing is slidingly mounted by inserting said guard into said slit.

3. The optical coupling module according to claim 2, wherein said guard comprises a plurality of guards radially arranged with respect to the side of said sleeve.

4. The optical coupling module according to claim 2, further comprising an inner stub for holding an end of a fiber stub, which is not covered with said sleeve, in a state in which said fiber stub for holding the optical fiber is inserted into an inside of said sleeve.

5. The optical coupling module according to claim 4, wherein said guard is formed to have a length not large enough for said guard to reach an end face of said inner stub on an opening side, so as to prevent said guard from interfering with said inner stub when said outer sleeve casing is slidingly mounted.

6. The optical coupling module according to claim 2, wherein the return structure of said splitting slit portion is formed at a location outward of the joined end faces.

7. The optical coupling module according to claim 2, wherein the return structure of said splitting slit portion is S-shaped.

8. The sleeve apparatus according to claim 1, wherein the return structure is configured to limit a deformation of the sleeve apparatus by narrowing the slit.

9. The sleeve apparatus according to claim 8, wherein the return structure is formed at a position distant from a position that the optical fibers connect.

10. The sleeve apparatus according to claim 1, wherein the return structure is S-shaped.

11. A method of manufacturing a split sleeve provided with a slit having a return structure, comprising the steps of:
    inserting a semi-cylindrical metal rod having a surface at an end portion thereof for diffusely reflecting a laser beam, into an inside of a die-cut sleeve;
    fixing the sleeve such that the sleeve is prevented from following up a motion of the metal rod;
    moving a cutting laser machine in accordance with a to-be-machined shape of the return structure, and causing the cutting laser machine to radiate a focused laser beam from outside the sleeve toward the surface at the end portion of the metal rod; and
    operating the surface at the end portion of the metal rod in a manner interlocked with the motion of the cutting laser machine, to form the return structure in a side of the sleeve, thereby manufacturing the split sleeve provided with the return structure.

12. The sleeve apparatus according to claim 1, wherein the return structure is formed in the slit at the portion at which the slit reverses its direction of extension twice.

13. The optical coupling module according to claim 2, wherein the return structure is at the portion of the slit at which the slit reverses its direction of extension twice.

* * * * *